Nov. 20, 1923.

P. DE MATTIA 1,475,109

COLLAPSIBLE CORE

Filed Sept. 7. 1922

WITNESSES

INVENTOR
Peter De Mattia
BY
ATTORNEYS

Nov. 20, 1923.

P. DE MATTIA 1,475,109

COLLAPSIBLE CORE

Filed Sept. 7, 1922

WITNESSES

INVENTOR
Peter De Mattia

ATTORNEYS

Nov. 20, 1923. 1,475,109
P. DE MATTIA
COLLAPSIBLE CORE
Filed Sept. 7, 1922 5 Sheets-Sheet 3
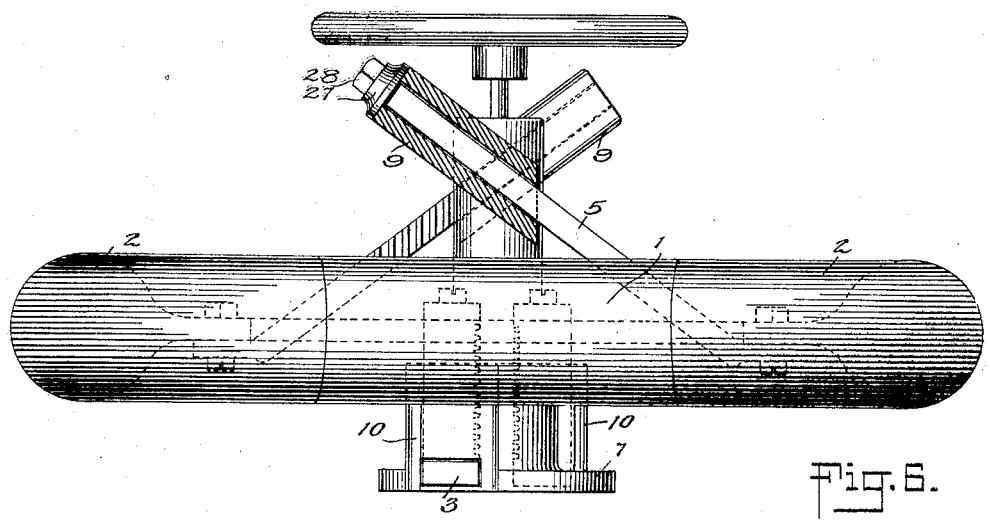
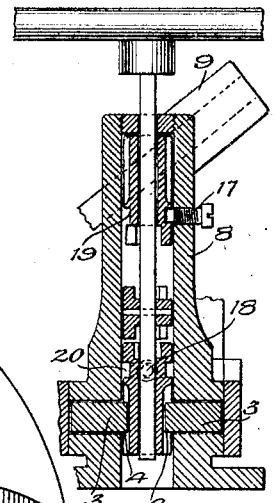
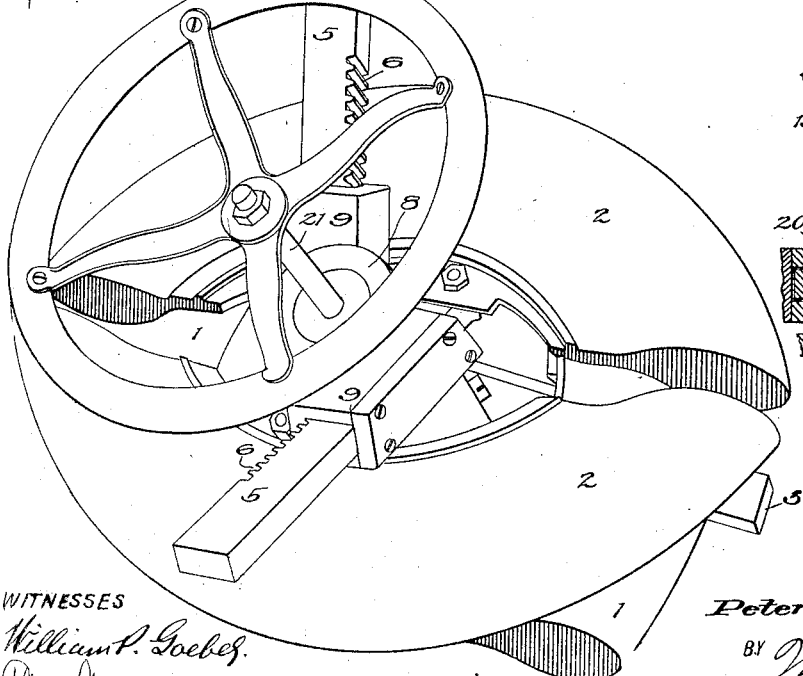
INVENTOR
Peter DeMattia
BY
ATTORNEYS
WITNESSES

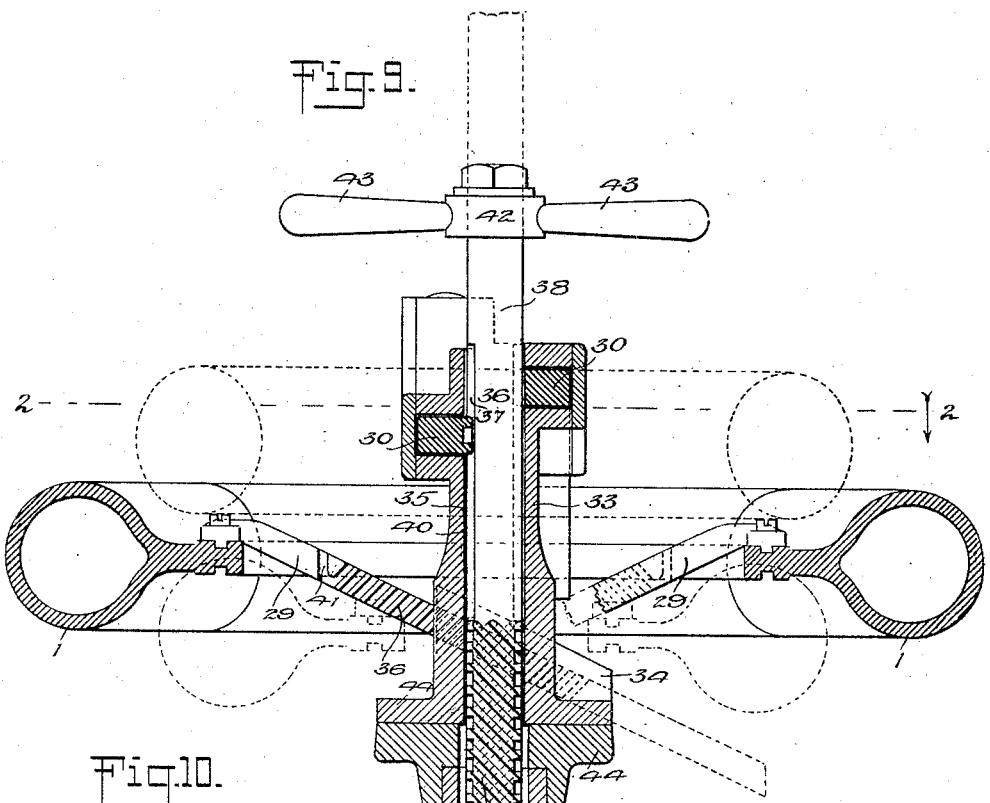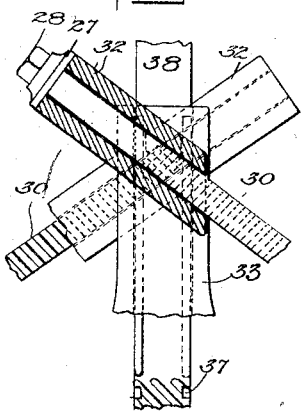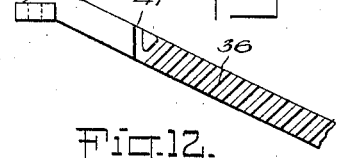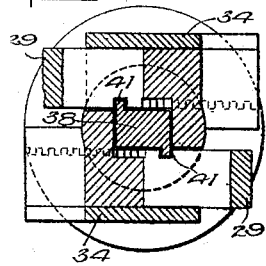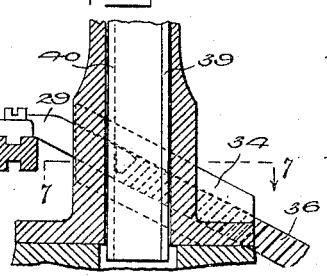

Patented Nov. 20, 1923.

1,475,109

UNITED STATES PATENT OFFICE.

PETER DE MATTIA, OF CLIFTON, NEW JERSEY.

COLLAPSIBLE CORE.

Application filed September 7, 1922. Serial No. 586,696.

*To all whom it may concern:*

Be it known that I, PETER DE MATTIA, a citizen of the United States, and a resident of Clifton, in the county of Passaic and State of New Jersey, have invented certain new and useful Improvements in Collapsible Cores, of which the following is a full, clear, and exact description, reference being had to the accompanying drawings.

The present invention relates to collapsible cores used in the manufacture of pneumatic tires, more particularly the shoes or casings for pneumatic tires. As is well known to those skilled in the art, such shoes or casings are built up of green or semi-cured rubber and fabric wrapped about a core, which imparts to them the shape desired, and thereafter they are removed from the core and vulcanized. It is desirable that the core be of such construction that the removal of the built-up tire shall be facilitated and effected with the least possible distortion thereof, and to this end the cores are now generally made of segmental sections movable with relation to each other, so that certain sections are withdrawn from the tire and the core collapsed to a greater or less degree.

An object of the present invention is to produce a collapsible core in which the sections are arranged in opposed pairs, each pair having collapsing and expanding movements in opposite directions toward and from a position of operative continuity, and into and out of the plane of operative continuity, thus not only providing for a more effective withdrawal of the core sections, but the unobstructed movement thereof.

To the above end the invention consists of the collapsible core which will be hereinafter described and claimed.

The invention is illustrated in the accompanying drawings, in which—

Figure 4 shows a side elevation, parts being shown in dotted lines, and a portion being in section;

Figure 5 shows a perspective view showing the core sections collapsed and retracted;

Figure 6 shows a transverse sectional view through the tubular standard or post, and illustrating certain operative parts;

Figure 9 shows a vertical sectional view with portions shown in elevation and with the retracted position of the core sections shown in dotted lines;

Figure 10 is a fragmentary detail view, parts being shown in section illustrating the position of the obliquely-disposed shanks when the sections are extended;

Figure 11 shows a side elevation of a portion of one of the shanks;

Figure 12 shows a section taken on the line 7—7 in Figure 13; and

Figure 13 shows a sectional view of portions of the device illustrating the means for locking the shanks of two of the sections in a retracted position.

Similar reference characters will be employed throughout the specification and drawings to designate corresponding parts.

Figure 1:
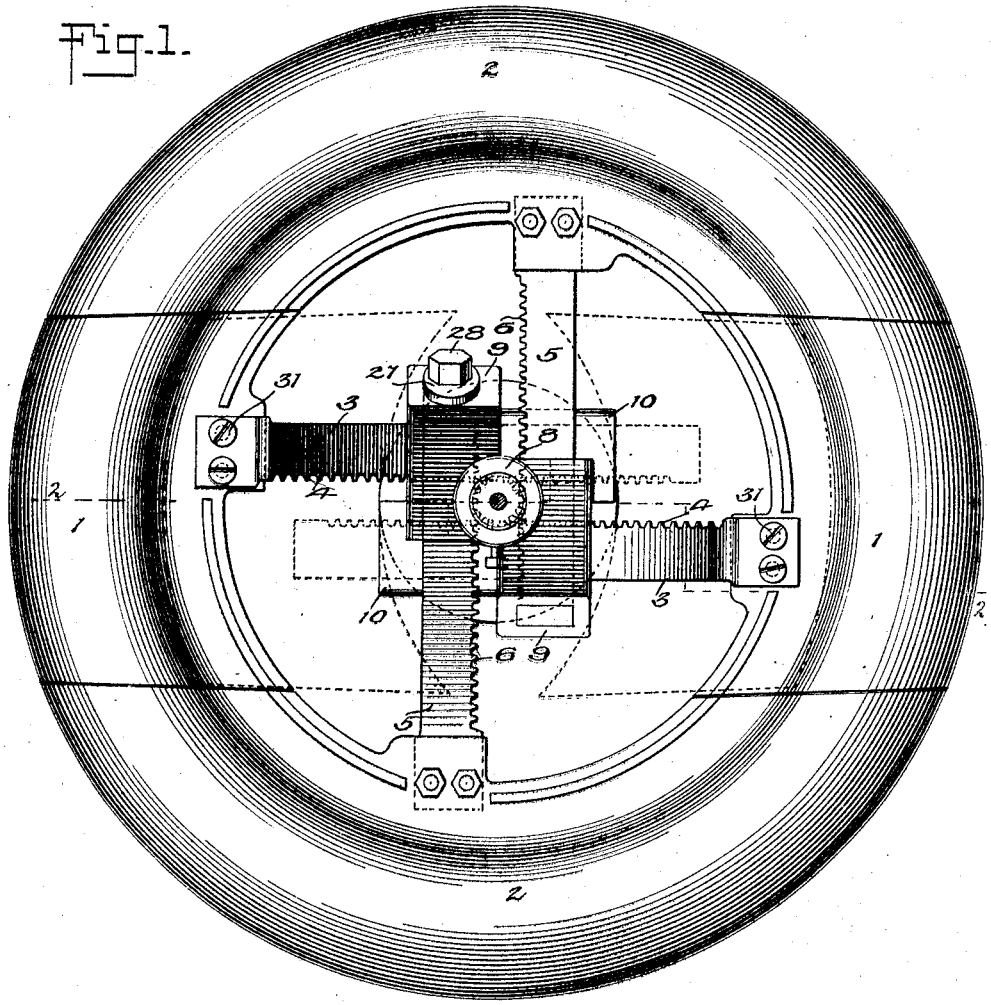
Figure 1 shows a plan view of the core and its operating instrumentalities, showing in dotted lines the retracted position of the key sections, the operating wheel being removed.
Figure 3:
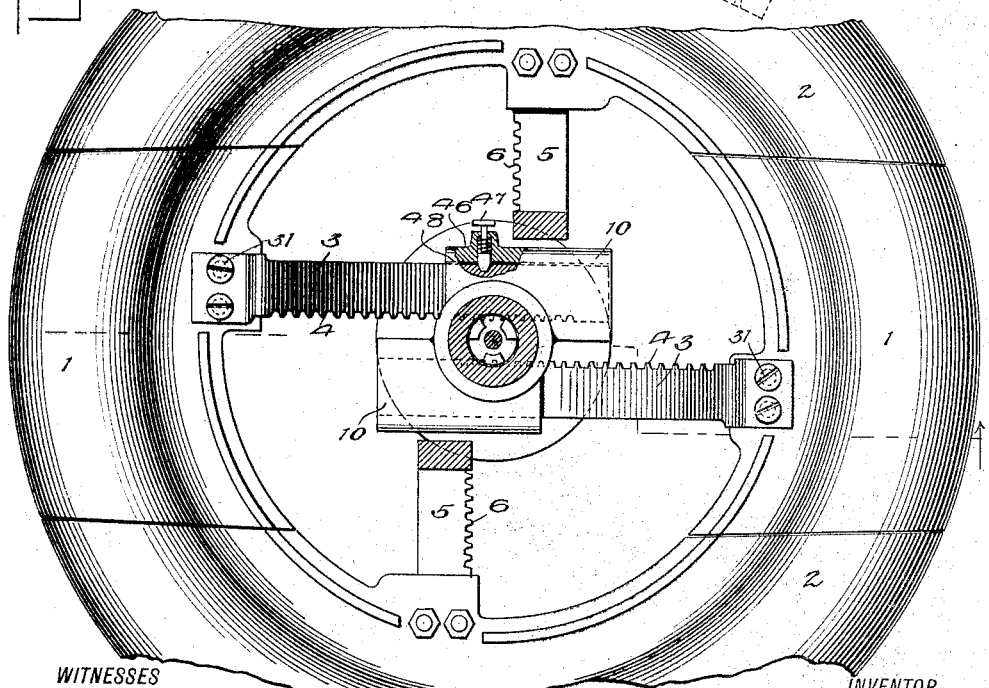
Figure 3 shows a horizontal sectional view taken on the line 3—3 in Figure 2.
Figure 7:
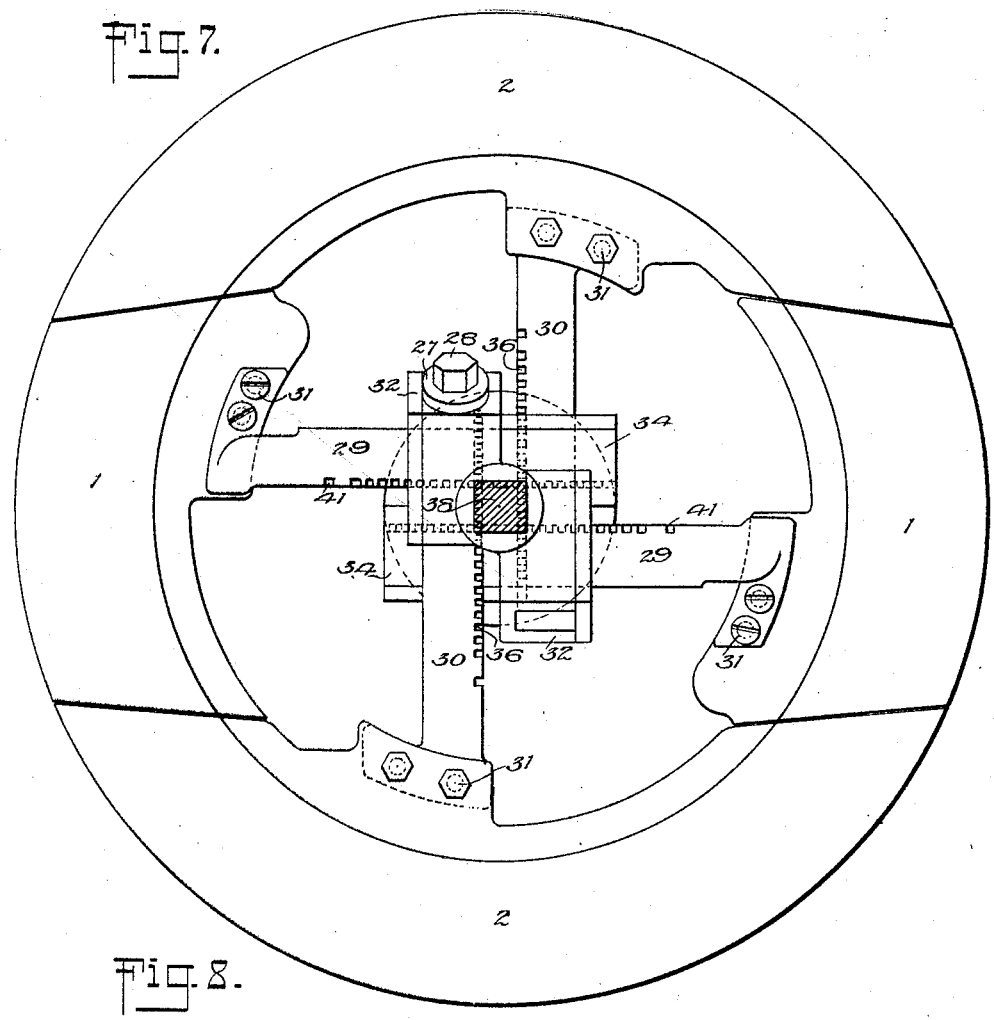
Figure 7 shows a plan view of a modified form of the device, a portion thereof being shown in transverse section.
Figure 8:
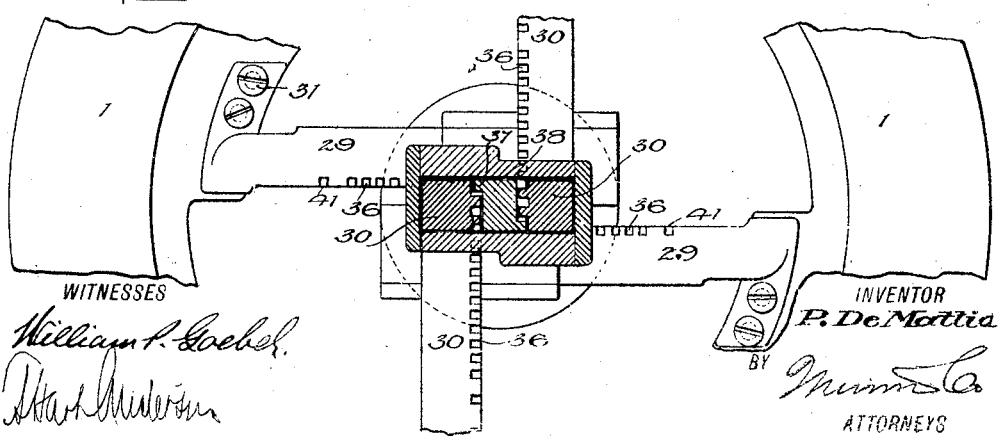
Figure 8 shows a fragmentary plan view, portions being shown in section taken on the line 2—2 in Figure 9.

As shown, the core is made up of four sections, two relatively short segmental key sections 1, and two relatively long segmental sections 2, said sections forming when expanded, a complete circular core, and preferably the meeting ends of the sections will be on lines cutting the plane of the core at right angles and slightly converging from the inner to the outer periphery, as clearly shown in Figs. 1 and 3; thus the key sections 1 will be slightly wedge shape. The key sections 1 are each secured to a shank 3, and these shanks are angularly disposed or obliquely arranged with relation to the plane of the core, as clearly indicated in the drawings, and along one edge, preferably the opposed inner edges, they are provided with rack teeth 4. The segmental sections 2 are provided with shanks 5, which like the shanks 3 are angularly or obliquely disposed with relation to the plane of the core, but extend in the opposite direction with relation to the shanks 3, and like the shanks 3 they are provided upon their opposing inner edges with rack teeth 6.

Extending upwardly from a base 7 is a tubular or cylindrical post 8, which near its upper end is provided with diametrically opposed and angularly or obliquely arranged bearings 9. Those bearings receive the obliquely disposed shanks 5 of the segmental sections 2, and in which the said shanks are arranged to have a free sliding movement. Near the bottom of the post 8 are similar bearings 10 disposed upon diametrically opposite sides of the post and like the bearings 9, arranged at an angle or obliquely to the plane of the core, in which the shanks 3 are arranged to freely slide.

As shown in Fig. 1, the pairs of bearings 9 and 10 are disposed at right angles to each other so that when the parts are assembled the pair of shanks 5 will be disposed at right angles to the pair of shanks 3.

It will be observed that by the arrangement just described, the sliding movement of the shanks 3 will produce inward and outward movements of the key sections 1 in an oblique direction; thus it may be said that the segmental sections 1 are moved obliquely to and from a position of operative continuity, and into and out of the plane of operative continuity of the core sections, and the core sections 2 have similar movements, but the movement into and out of the plane of operative continuity is in a direction opposite to the corresponding movement of the key sections 1. By such an arrangement provision is made for a maximum collapsing movement of one pair of sections without interference with another pair of sections.

For the purpose of imparting movement to the sections, as the apparatus is illustrated in Figs. 1 to 6, the combined clutch and gear members 11 and 12 are mounted within the hollow post 8. Each member 11 and 12 is provided with gear teeth 13 and 14, and each is provided with a clutch member 15 and 16, and held in the tubular post by means of screws 17 and 18 (see Figs. 2 and 6), engaging grooves 19 and 20. The teeth 13 of the combined gear and clutch member 11, engage the rack teeth 6 of the shanks 5, and the teeth 14 of the combined gear and clutch member 12 engage the rack teeth 4 of the shanks 3. A centrally disposed shaft 21 passes freely through the combined clutch and gear members so that it may turn therein and move therethrough, and at its lower end it is provided with a stop 22 to limit its upward movement, and at its upper end it is provided with a hand wheel 23, the hub 24 of which, contacting with the upper end of the post 8, acts as a stop to limit the downward movement (see Fig. 2). This shaft 21 carries a double clutch member 25 (see Fig. 2) which is fixedly secured to the shaft 21 by means of a pin 26, so that the double clutch member will partake of the rotary movement of the shaft 21 and also the longitudinal movement thereof. By means of the longitudinal movement the double clutch member 25 is arranged to be engaged with either the clutch member 15 or the clutch member 16, by means of intermeshing notches and teeth as shown, and when engaged therewith the rotary movement imparted to the shaft 21 will be imparted to the combined clutch and gear members 11 and 12, so as to rotate them, and thus by means of the rack teeth 13 and 14, impart movement to the shanks 3 and 5. By shifting the shaft 21 the double clutch member will be moved to disengage one of the members and engage the other, or it may occupy a position between them, disconnected from both.

Figure 2:
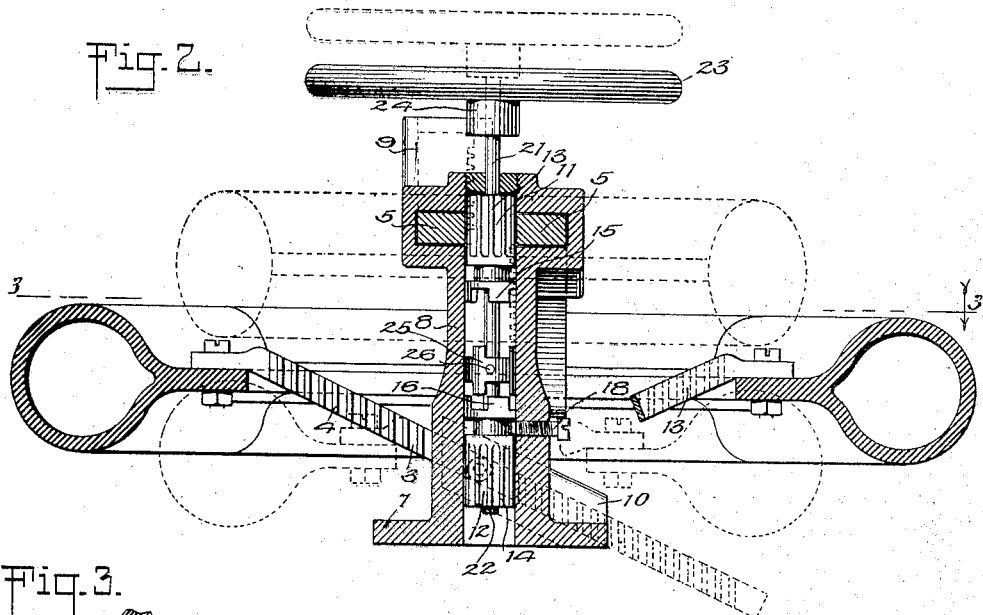
Figure 2 shows a transverse section taken on the line 2—2 in Figure 1, and showing in dotted lines the relative positions of the core sections when collapsed or retracted.

Assuming that the parts are in the position shown in Fig. 1, which may be described as the position of operative continuity, with all parts of the core in the same plane, which may be described as the plane of operative continuity, the key sections are intended to be withdrawn first, and to that end the shaft 21 will be moved downwardly, and the double clutch member 25 engaged with the clutch member 16; whereupon the shaft may be rotated by means of the hand wheel 23 and the shanks 3 simultaneously retracted, causing the sections 1 to be withdrawn from the tire and to move downwardly and inwardly as indicated in dotted lines in Figs. 1 and 2. Having been moved inwardly to the extent required to withdraw them from the tire, the shaft 21 will be moved upwardly to engage the clutch and gear member 11, which will cause the shanks 5 to be retracted, imparting an inward and upward movement to the sections 2, thus those sections will be withdrawn from the tire and elevated, as indicated in dotted lines in Fig. 2. Of course the reverse movement will operate the pairs of sections in a reverse direction, moving each pair into the plane of operative continuity in an oblique direction, and into a position of operative continuity.

A suitable stop is provided to limit the outward and downward movement of the sections 2, this stop comprising a collar 27 held by a bolt 28 to the end of one of the shanks 5, arranged to bear against the end of one of the bearings 9. When this stop comes into contact with the bearing 9 the sections 2 will be expanded to the proper degree to position them with respect to the position of and plane of operative continuity.

In Figures 7 to 13 inclusive is shown a modified form of the device, in which the movement of the core sections into and out of a position of operative continuity and with relation to the plane of operative continuity is effected by a centrally disposed and longitudinally movable actuator so combined and arranged that moving the actuator in one direction will alternately engage and retract the shanks of oppositely disposed pairs of core sections, simultaneously displacing them with relation to the plane of operative continuity, and the reverse movement of the actuator will alternately engage and extend the pairs of core sections and move them into the plane of operative continuity, and the arrangement embodies means whereby in both positions the parts will be held from movement or accidental displacement.

Like the form of the device which has been heretofore described, the modified form is composed of a pair of key sections 1 and a pair of longer sections 2. Each of these sections is mounted upon an obliquely disposed shank, the shanks 29 carrying the key sections 1 and the shanks 30 carrying the longer sections 2. Preferably, the core sections in every case will be made separate from the shanks and connected thereto in any suitable manner, as by means of the screws or bolts 31. The pair of shanks 29 carrying the key sections extend downwardly and obliquely as indicated in Fig. 9, and the shanks 30 carrying the core sections 2 extend upwardly and obliquely as indicated in Fig. 10. The shanks 30 are disposed in obliquely arranged and diametrically opposed bearings 32 supported by the cylindrical post 33, and in like manner the shanks 29 are received within and arranged to slide freely in the obliquely disposed and diametrically opposed bearings 34, at or near the base of the cylindrical post 33, and like the form which has been heretofore described, these pairs of bearings are disposed at right angles to each other. The bearings open into the bore or chamber 35 of the post 33 in such manner that the rack teeth 36 formed upon the inner opposed faces of the shanks 29 and 30 extend into the said chamber 35 in position to be engaged by the rack teeth 37 formed upon the four sides of the longitudinally movable actuating rod 38. It will be observed that the rack teeth 36 on the shanks are formed upon an angle of 45 degrees, and that the rack teeth 37 are of a corresponding angle, and that the rack teeth on each pair of shanks are inclined in opposite directions, and that the actuating rod 38 is provided with rack teeth 37 upon four sides, those upon diametrically opposite sides being disposed at right angles to each other and all of the rack teeth 37 being upon an angle of substantially 45 degrees. By this arrangement a longitudinal movement of the actuating rod 38 will cause the rack teeth 37 to be engaged with the rack teeth 36 and impart inward and outward movements to the shanks. The portion of the actuating rod 38 which is provided with rack teeth 37 is relatively short but it is of such a length that a complete longitudinal movement thereof across the line of movement of the shanks will move those shanks a sufficient distance to fully retract them and to fully extend them, and also so that when the rack teeth 37 have moved one pair of shanks the required distance it will at that time engage and move the other pair of shanks. The actuating rod 38 carries at its opposite ends, splines 39 and 40 located at diametrically opposed corners of the actuating rod 38, the arrangement being such that at the time the toothed sections 37 release the pair of shanks 29 the splines 39 or 40 will engage therewith. For this purpose each of the shanks 29 will be provided with a groove 41 arranged to be engaged by the splines when the rod is moved and just as the toothed sections 37 pass from engagement with the shanks 29 (see Figs. 11, 12 and 13). Any suitable means may be employed to move the actuating rod 38 longitudinally, and in the drawing it is shown as being provided with a head 42 provided with handles 43. The cylindrical post 33 is provided with a base 44 which may be secured to any suitable support and in both cases it may be supported vertically as indicated in the drawings, or horizontally. One form of support shown in Fig. 9 consists of a hollow shank 45.

In operation, the operator by means of the handles 43 imparts a longitudinal movement to the rod 38, and assuming that the core sections are in a position of operative continuity and the plane of operative continuity, the rack teeth 37 on the rod 38 will first engage the shanks 29 to retract and move downwardly the key sections 1. The continued movement of the rod 38 in the same direction will cause the rack teeth 37 to engage the shanks 30 and retract and elevate the core sections 2. A reverse movement of the rod 38 will cause a reverse movement of the sections, placing them again in a position of operative continuity and in the plane of operative continuity.

With all the parts in retracted position I provide a spring actuated bolt 46 having a head 47 and mounted in one of the bearings 10, the inner end of the bolt engaging a socket 48 in one of the shanks 3. (See Fig. 3 of the drawing.)

I claim:

1. A collapsible core, comprising a plurality of segmental core sections arranged in diametrically opposed pairs, and means to simultaneously move one pair of said core sections radially and obliquely into and out of a position of operative continuity, and with relation to the plane of operative continuity of the core.

2. A collapsible core, comprising a plurality of segmental core sections arranged in diametrically opposed pairs, and means to move the pairs of said core sections in opposite directions radially and in an oblique direction with relation to the position of and plane of operative continuity of the core.

3. A collapsible core, comprising a plurality of segmental core sections arranged in diametrically opposed pairs, and means to move one pair of core sections in opposite directions into and out of a position of operative continuity and in the same direction with relation to the plane of operative continuity.

4. A collapsible core, comprising a plurality of core sections disposed in oppositely arranged pairs, inclined shanks carried by said sections, and means to engage and move the shanks of each pair of sections.

5. A collapsible core, comprising a plurality of pairs of oppositely disposed sections and a common actuating device having a detachable connection with, and arranged to move the pairs of sections.

6. A collapsible core, comprising a plurality of pairs of oppositely disposed sections and a common actuating device for moving the pairs of sections in opposite directions radially and obliquely toward and from a position of and the plane of operative continuity.

7. A collapsible core, comprising a cylindrical post, a shaft disposed therein, bearings at diametrically opposite points on said post, core sections arranged in pairs having shanks arranged in pairs and sliding in said bearings, and means for alternately coupling the shaft to said pairs of shanks.

8. A collapsible core, comprising a plurality of segmental core sections, a longitudinally movable shaft, and means for connecting said shaft to and moving said core sections.

9. In combination, a collapsible core comprising a plurality of segmental core sections, means to move two adjacent core sections in opposite directions into and out of the plane of operative continuity and obliquely into and out of operative continuity.

10. In combination, a collapsible core comprising two pairs of segmental core sections, the sections in each pair being diametrically opposite each other, and means to move adjacent sections of a pair of sections in opposite directions into and out of the plane of operative continuity and obliquely into and out of operative continuity.

11. In combination, a collapsible core comprising a plurality of segmental core sections, means to move two associated core sections in different directions into and out of the plane of operative continuity and obliquely into and out of operative continuity.

12. In combination, a collapsible core comprising a plurality of segmental core sections, means to move two adjacent core sections in opposite directions into and out of the plane of operative continuity and into and out of operative continuity.

PETER DE MATTIA